(12) United States Patent
Kapoor et al.

(10) Patent No.: US 10,992,635 B2
(45) Date of Patent: Apr. 27, 2021

(54) ESTABLISHING CONNECTION BETWEEN DIFFERENT OVERLAY NETWORKS USING EDGE APPLICATION GATEWAY

(71) Applicant: COLORTOKENS, INC., Santa Clara, CA (US)

(72) Inventors: Anoop Singh Kapoor, San Jose, CA (US); Ashish Trivedi, Fremont, CA (US); Ravi Voleti, Fremont, CA (US); Deepak Mohanty, Fremont, CA (US); Mritunjay Kumar, San Jose, CA (US)

(73) Assignee: COLORTOKENS, INC., Santa Clara, CA (US)

( * ) Notice: Subject to any disclaimer, the term of this patent is extended or adjusted under 35 U.S.C. 154(b) by 116 days.

(21) Appl. No.: 16/163,527

(22) Filed: Oct. 17, 2018

(65) Prior Publication Data

US 2020/0127963 A1    Apr. 23, 2020

(51) Int. Cl.
| | |
|---|---|
| *H04J 3/16* | (2006.01) |
| *H04L 29/12* | (2006.01) |
| *H04L 12/741* | (2013.01) |
| *H04L 12/66* | (2006.01) |
| *H04L 29/08* | (2006.01) |

(52) U.S. Cl.
CPC ......... *H04L 61/1511* (2013.01); *H04L 12/66* (2013.01); *H04L 45/74* (2013.01); *H04L 61/2007* (2013.01); *H04L 67/02* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 7,729,365 B2 * | 6/2010 | Motegi | ............... | H04L 12/2818 370/352 |
| 8,224,931 B1 * | 7/2012 | Brandwine | ......... | H04L 41/5051 709/220 |
| 8,560,646 B1 * | 10/2013 | Sivasubramanian | ... | H04L 41/08 709/220 |
| 8,612,627 B1 * | 12/2013 | Brandwine | ............. | H04L 69/14 370/238 |

(Continued)

*Primary Examiner* — Kwang B Yao
*Assistant Examiner* — Juvena W Loo
(74) *Attorney, Agent, or Firm* — Barry Choobin; Patent 360LLC

(57) ABSTRACT

A system and method for routing data packets between different overlay networks is disclosed. The method includes receiving a DNS lookup request for a resource from a first computing device coupled to a first overlay network. The first overlay network comprises a first edge application gateway. The method includes identifying a second computing device coupled to a second overlay network comprising the resource requested. The second overlay network comprises a second edge application gateway. The method further includes identifying a third overlay network. The data packets generated at, the first computing device is transferred to the first edge application gateway. The data packets are then transmitted from the first edge application gateway and the second edge application gateway over the third overlay network. Further, the data packets are transferred from the second edge application gateway to the second computing device thereby establishing communication between computing devices in different overlay network.

13 Claims, 5 Drawing Sheets

(56) References Cited

U.S. PATENT DOCUMENTS

| | | | | |
|---|---|---|---|---|
| 9,306,949 B1* | 4/2016 | Richard | ............. | H04L 63/0272 |
| 2008/0201486 A1* | 8/2008 | Hsu | .................... | H04L 61/2517 |
| | | | | 709/238 |
| 2011/0153937 A1* | 6/2011 | Annamalaisami | ...... | H04L 69/16 |
| | | | | 711/118 |
| 2013/0212241 A1* | 8/2013 | Kang | ..................... | H04L 45/64 |
| | | | | 709/223 |
| 2014/0133354 A1* | 5/2014 | Scharf | .................... | H04L 45/42 |
| | | | | 370/254 |
| 2015/0188823 A1* | 7/2015 | Williams | ............ | H04L 63/0272 |
| | | | | 370/235 |
| 2016/0036773 A1* | 2/2016 | Luo | ...................... | H04L 45/745 |
| | | | | 370/392 |
| 2016/0094440 A1* | 3/2016 | Huang | ................... | H04L 45/74 |
| | | | | 370/392 |
| 2016/0359745 A1* | 12/2016 | Hao | ................... | H04L 12/4641 |
| 2017/0171144 A1* | 6/2017 | Sagiraju | ............... | H04L 61/2007 |
| 2017/0195161 A1* | 7/2017 | Ruel | ............... | H04L 63/061 |
| 2017/0195237 A1* | 7/2017 | Parasmal | ........... | H04L 12/2869 |
| 2018/0176176 A1* | 6/2018 | Kapur | .................... | H04L 67/10 |
| 2018/0176178 A1* | 6/2018 | Kuo | .................. | H04L 61/2575 |
| 2019/0260599 A1* | 8/2019 | Williams | ........... | H04L 63/0209 |
| 2020/0067982 A1* | 2/2020 | Leach | ................ | H04L 61/2007 |

* cited by examiner

ESTABLISHING CONNECTION BETWEEN DIFFERENT OVERLAY NETWORKS USING EDGE APPLICATION GATEWAY

BACKGROUND

Technical Field

The embodiments herein are generally related to the field of internetworking between multiple overlay networks and routing data packets between two different overlay networks.

Description of the Related Art

An overlay network is a computer network built on top of another network called an underlay network. Nowadays, internet act as the underlay network over which many overlay network is constructed. The overlay network was proposed to provide additional security while communicating over the internet. The overlay networks are proposed as a way to improve Internet routing such as quality of services, network security and the like. The nodes in the overlay network are connected through a virtual or logical links or through physical links in the underlay network. The overlay network runs as an independent virtual network. An overlay socket coupled to the overlay network enables data transfer between the different nodes. However, efficient data transfer between different overlay network needs to be addressed.

Hence, there is a need for a system and a method for routing data packets between different overlay networks. There is also a need for a method for establishing communication between overlay networks using an edge application gateway.

SUMMARY OF THE EMBODIMENT HEREIN

The embodiments herein provide a system and method for routing data packets between different overlay networks. The method includes receiving a DNS lookup request for a resource from a first computing device coupled to a first overlay network. The method includes identifying a second computing device coupled to a second overlay network comprising the resource requested. The method further includes identifying a third overlay network to enable communication between the first overlay network and the second overlay network. The data packets generated at the first computing device is transferred to a first edge application gateway coupled to the first overlay network. The data packets are then transmitted from the first edge application gateway and the second edge application gateway over the third overlay network. Further, the data packets are transferred from the second edge application gateway to the second computing device thereby establishing communication between computing devices in different overlay network.

According to an embodiment herein, a computing network system is disclosed. The computing network comprises a plurality of overlay networks, a Domain Name System (DNS) server and a controller. The plurality of overlay networks is connected to a cloud network. Each overlay network comprises a plurality of computing devices and an edge application gateway. The Domain Name System (DNS) server is configured to store an overlay IP address of each computing device among the plurality of computing devices connected to each overlay network and a uniform resource locator (URL) of the resources installed on the plurality of computing devices. The controller is configured to enable routing of data communication from a first overlay network to a second overlay network among the plurality of overlay networks through a first edge application gateway on the first overlay network and a second edge application gateway on the second overlay network. The first edge application gateway and the second edge application gateway stitch the first overlay network to the second overlay network, using a third overlay network.

According to an embodiment herein, the plurality of computing devices is selected from a group consisting of computers, laptops, mobile phones, servers and databases.

According to an embodiment herein, the data packet comprises a header containing a source IP address and a destination IP address.

According to an embodiment herein, each overlay network among the plurality of overlay networks is created by generating an overlay address space by assigning an overlay Internet Protocol (IP) address to each computing device among the plurality of computing devices coupled to each overlay network.

According to an embodiment herein, the controller identifies a DNS lookup request fir a resource from a first computing device in the first overlay network among the plurality of overlay networks. The controller identifies a second computing device in the second overlay network comprising the resource requested. The controller further generates the data packet with a header comprising a source IP address and a destination IP address. The source IP address is a first overlay IP address of the first computing device and the destination IP address is a second overlay IP address assigned to the second computing device. The controller identifies the third overlay network coupled to both the first edge application gateway in the first overlay network and the second edge application gateway in the second overlay network. The controller transmitting the data packet from the first edge application gateway to the second edge application gateway over the third overlay network. Further, the controller transfers the data packets from the second edge application gateway to the second computing device for routing the data packets from the first overlay network to the second overlay network.

According to an embodiment herein, the first edge application gateway transmits the data packet to the second edge application gateway by converting the source IP address in the data packet as a third overlay IP address of the first edge application gateway coupled to the third overlay network. Further the method converts the destination IP address in the data packet as a fourth overlay IP address of the second edge application gateway coupled to the third overlay network.

According to an embodiment herein, each edge application gateway is coupled to multiple overlay networks among the plurality of overlay networks.

According to an embodiment herein, the data packets are muted from the first overlay network to the second overlay network when the first edge application gateway and the second edge application gateway are connected to a common overlay network.

According to an embodiment herein, the rust overlay network and the second overlay network are stitched together using the third overlay network.

According to an embodiment herein, the first overlay network and the second overlay network is one of a proprietary network or Virtual Extensible Local Area Network.

According to an embodiment herein, each edge application gateway resides in an overlay network acting as a demilitarized zone (DMZ) of a computer network.

According to an embodiment herein, a computer implemented method of routing data packets between multiple overlay networks through an edge application gateway is disclosed. The computer implemented method includes storing computer-executable program instructions on one or more non-transitory computer readable storage media. The computer implemented method includes executing the program instructions by a processing system in a controller for routing the data packets between a first overlay network and the second overlay network. On executing the program instructions, the controller identifies a DNS lookup request for a resource from a first computing device in the first overlay network among a plurality of overlay networks. Each overlay network comprises a plurality of computing devices and the edge, application gateway. The controller identifies a second computing device in the second overlay network comprising the resource requested. Further, the controller generates a data packet with a header comprising a source IP address and a destination IP address. The source IP address is a first overlay IP address of the first computing device and the destination IP address is a second overlay IP address assigned to the second computing device. The computer implemented method includes identifying a third overlay network coupled to both a first edge application gateway in the first overlay network and a second edge application gateway in the second overlay network. The computer implemented method includes transmitting the data packet from the first edge application gateway to the second edge application gateway over the third overlay network. The computer implemented method includes transferring the data packets from the second edge application gateway to the second computing device for routing the data packets from the first overlay network to the second overlay network.

According to an embodiment herein, the data packet is generated with the source IP address as the first overlay IP address assigned to the first computing device in the first overlay network and the destination IP address as the second overlay IP address assigned to the second computing device in the second overlay network.

According to an embodiment herein, the step of transmitting the data packet from the first edge application gateway to the second edge application gateway includes converting the source IP address in the data packet as a third overlay IP address of the first edge application gateway coupled to the third overlay network. The step further includes converting the destination IP address in the data packet as a fourth overlay IP address of a second edge application gateway coupled to the third overlay network.

According, to an embodiment herein, the first edge application gateway and the second edge application network is coupled to multiple overlay networks among the plurality of overlay networks.

According to an embodiment herein, routing data packets between the fast overlay network and the second overlay network is performed when the first edge application gateway and the second edge application gateway is coupled to a common overlay network.

According to an embodiment herein, the second computing device in the second overlay network is identified by the controller from a Domain Name System (DNS) server comprising overlay IP address of each computing device in the plurality of computing devices and the Uniform Resource Locator (URL) of each resource.

According to an embodiment herein, the routing is performed between two homogeneous networks.

According to an embodiment herein, the routing is performed between two heterogeneous networks.

According to an embodiment herein, the data packets are transferred from the second edge application gateway to the second computing device over the second overlay network by converting the destination IP address to the second overlay IP address of second computing device.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of an illustration and not of a limitation. Many changes and modifications may be made within the scope of the embodiments herein without departing from the spirit thereof, and the embodiments herein include all such modifications.

BRIEF DESCRIPTION OF THE DRAWINGS

The other objects, features, and advantages will be apparent to those skilled in the art from the following description of the preferred embodiment herein and the accompanying drawings in which.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS HEREIN

In the following detailed description, reference is mode to the accompanying drawing that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The embodiments herein provide a system and method for routing data packets between different overlay networks. The method includes receiving a DNS lookup request for a resource from a first computing device coupled to a first overlay network. The method includes identifying a second computing device coupled to a second overlay network comprising the resource requested. The method further includes identifying a third overlay network to enable communication between the first overlay network and the second overlay network. The data packets generated at the first computing device is transferred to a first edge application gateway coupled to the first overlay network. The data packets are then transmitted from the first edge application gateway and the second edge application gateway over the third overlay network. Further, the data packets are transferred from the second edge application gateway to the second computing device thereby establishing communication between computing devices in different overlay network.

Figure 1:
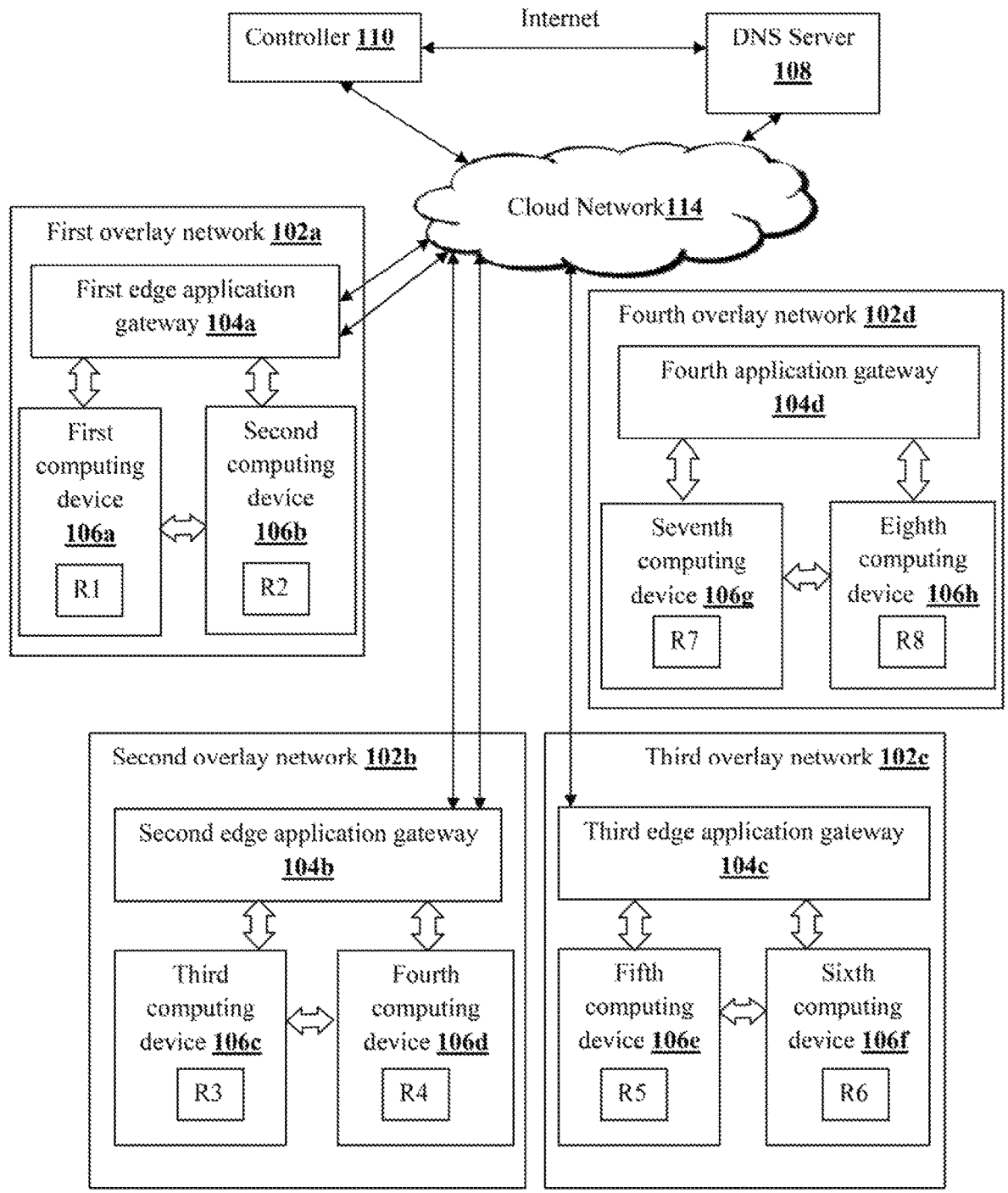
FIG. 1 illustrates a functional block diagram of a system for routing data packets between different overlay networks, according to one embodiment herein.

FIG. 1 illustrates a functional block diagram of a system for routing data packets between different overlay networks, according to one embodiment herein. The system comprises a plurality of overlay networks 102a, 102b . . . 102n communicating to each other over a cloud network 114. The plurality of overlay networks 102a, 102b . . . 102n comprises a plurality of computing devices 106a, 106b . . . 106h and a plurality of edge application gateways 104a, 104b . . . 104d coupled to one of the overlay network. Consider a first computing device 106a, a second computing device 106b and a first edge application gateway 104a is coupled to a first overlay network 102a, a third computing device 106c, a fourth computing device 106d and a second edge application gateway 104b is coupled to a second overlay network 102b, a fifth computing device 106e, a sixth computing device 106f and a third edge application gateway 104c is coupled to a third overlay network 102c and a seventh computing device 106g, an eighth computing device 106f and a fourth edge application gateway 104d is coupled to a fourth overlay network 102d.

The examples of plurality of computing devices 106a, 106b . . . 106h includes but are not limited to computers, mobile phones, smart phones, servers and the like. Each overlay network is termed as a color zone and is assigned with an address space. For example consider that the first overlay network 102a is termed as a blue color network, the second overlay network 102b is termed as a green color network, the third overlay network 102c is termed as a red color network and the fourth overlay network 102d is termed as a yellow color network. The plurality of edge application, gateways is capable of being connected to multiple overlay networks among the plurality of overlay networks 102a, 102b . . . 102n. For example consider that the first edge application gateway 104a is connected the blue color network and a black color network, the second edge application gateway is connected to the green color network, the black color network and a yellow color network and so on. Each overlay network is, provided with a dedicated address space.

Further, each computing device among the plurality of computing devices 106a, 106b . . . 106h in the plurality of overlay network 102a, 102b . . . 102n is assigned with an overlay IP address. The overlay IP address is assigned to each computing device based on the address space allocated to each overlay network. The overlay IP address assigned to each computing device is stored in a Domain Name System (DNS) server 108. The DNS server 108 further stores the uniform resource locator (URL) of resources in each computing device in the plurality of overlay networks. The resources are installed in each computing device. For example, consider that a resource R1 is installed on a first computing device 106a, a second resource R2 is installed on a second computing device 106b, a third resource R3 is installed on the third computing, device 106e, a fourth resource R4 is installed on the fourth computing device and so on.

The computing devices among the plurality of computing device 106a, 106b . . . 106f coupled to the first overlay network 102a communicates over the first overlay network 102a. Similarly, the computing devices among the plurality of computing device 106a, 106b . . . 106h coupled to the second overlay network 102b communicates over the second overlay network 102b. The con un cation between different overlay, networks is established as follows.

Initially, a DNS lookup request is initiated by a computing device among the plurality of computing devices 106a, 106b . . . 106h. Suppose, the DNS lookup request is raised by the first computing device 106a coupled to the first overlay network 102a. A controller 110 transfers the DNS lookup request to the DNS server 108. The DNS server 108 identifies a computing device comprising the resource requested. Consider the DNS lookup request is raised for resource R2. The DNS server 108 identifies the second computing device 106b coupled to the first overlay network 102a. Further, the overlay IP address of the second computing device 106b is obtained from the DNS server 108 and transferred to the first computing device 106a. Further a data packet is generated with source IP address as the overlay IP address of the first computing device 106a and the destination IP address as the overlay IP address of the second computing device 106b. Since the first computing device 106a and the second computing device 106b are coupled to the first overlay network or blue color network, the communication between the first computing device 106a and the second computing device 106b are established over the blue color network.

Now, consider a scenario where a first computing device 106a initiates a DNS lookup request for a sixth resource R6. The controller 110 transfers the DNS lookup request to, the DNS server 108. The DNS server 108 identifies the sixth computing, device 106f comprising the sixth resource R6. Further, the data packet is generated with source address as the overlay IP address of the first computing device 106a and the destination IP address as the overlay IP address of the sixth computing device 106f. The controller 110 identifies that the sixth computing device 106f is coupled to a third overlay network 102c called red color network. Since the first computing device 106a and the sixth computing device 106f are coupled to different overlay networks, the controller 110 transfer the data packet to the first edge application gateway 104a coupled to the first overlay network 102a.

Further, the controller 110 identifies a fifth overlay network 102e coupled to the first edge application gateway 104a and the third edge application gateway 104c. The third edge application gateway is further coupled to the third overlay network 102c. The controller identifies the overlay IP address of the first edge application gateway 104a and the third edge application gateway 104c in the address apace assigned to the fifth overlay network 102e. The overlay IP address of the first edge application gateway 104a and the third edge application gateway 104c is provided to the first edge application gateway. 104a.

Further the source IP address in the data packet is converted to the overlay IP address of the first edge application gateway 104a and the destination IP address in the data packet is converted to the overlay IP address of the third edge application gateway 104c. Further, the data packet is transferred from the first edge application gateway 104a to the third edge application gateway 104c over the fifth overlay network 102e. Suppose the fifth overlay network 102e is a black color network. The data packet received at the third edge application gateway 104c is further transferred to the sixth computing device 106f over the third overlay network 102c.

Figure 2:
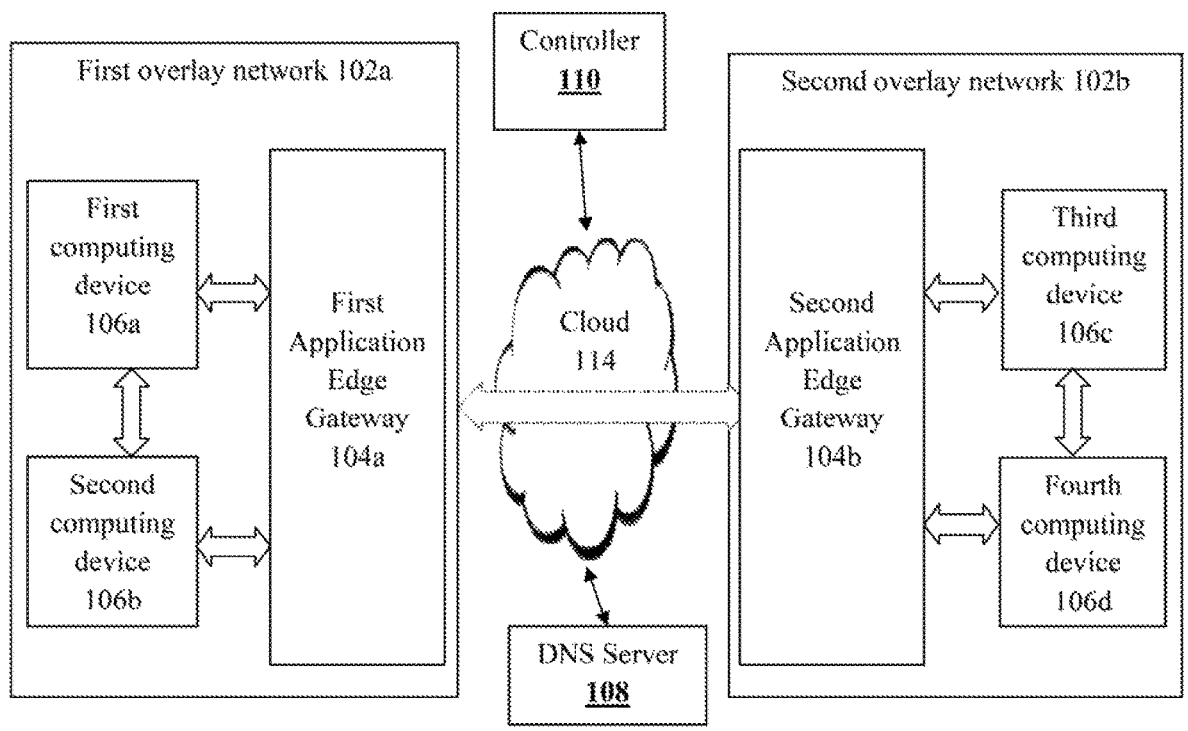
FIG. 2 illustrates a functional block diagram of a system for routing data packets between a first overlay network and a second overlay network, according to one embodiment herein.

FIG. 2 illustrates a functional block diagram of a system for routing data packets between a first overlay network and a second overlay network, according to one embodiment herein. The system comprises a plurality of overlay network 102a, 102b . . . 102n, A first overlay network 102a and a second overlay network 102b are connected over a cloud network 114. The first overlay network 102a and the second overlay network 102b are perimeter networks in a demilitarized zone of a large network. The first overlay network 102a and the second overlay network 102b are either homogeneous networks or heterogeneous networks. The first overlay network 102a and the second overlay network 102b are chosen from a network including any one of a one of a proprietary network or Virtual Extensible Local Area Network.

The system further comprises a plurality of computing devices 106a, 106b, 106c and 106d coupled to the plurality of overlay network. A first computing device 106a, a second computing device 106b and a first edge application gateway 104a is coupled to the first overlay network 102a. A third computing device 106c, a fourth computing device 106d and a second edge application gateway 104b are coupled to the second overlay network 102b. Further, the first edge application gateway 104a and the second edge application gateway 104b are coupled to multiple overlay networks among the plurality of overlay networks 102a, 102b . . . 102n.

Consider a first computing device 106a coupled to the first overlay network 102a initiating a DNS lookup request fort resource R4. A controller 110 coupled to the cloud network 114 transfers the DNS lookup request to the DNS server 108. The DNS server 108 identifies the computing device among the plurality of computing device 106a, 106b, 106c and 106d comprising the resource R4. The DNS server 108 identifies the fourth computing device 106d comprising the resource R4. The DNS server 108 obtains the overlay IP address of the first computing device 106a and the fourth computing device 106d coupled. The controller 110 transfers the overlay IP address of the first computing device 106a and the fourth computing device 106d to the first computing device 106a.

The overlay IP address of the first computing device 106a is assigned from the address space of the first overlay network 102a or the blue color network. Suppose the address space assigned to first overlay network 102a is 192.168.1.(X). Consider the overlay IP address of the first computing device 106a as 192.168.1.1. Further, the overlay IP address of the fourth computing device 106d is assigned from the address space of the second overlay network 102b or the green color network. Suppose the address space assigned to second overlay network 102b is 192.168.2.(X). Consider the overlay IP address of the fourth computing device 106d as 192.168.2.2.

Further, a data packet is generated with a source IP address and a destination IP address. The source IP address is the overlay IP address of the first computing device 106a and the destination IP address is the overlay IP address of the fourth computing device 106d. Therefore, the source IP address is 192.168.1.1 and the destination IP address is 192.168.12. Further, the controller 110 identifies if the fourth computing device 106d is coupled to a different overlay network compared to the first computing device 106a. Therefore, the controller 110 transfers the data packet to the first edge application gateway 104a.

Further, the controller 110 identifies an overlay network 102f connected to both the first edge application gateway 104a and the second edge application gateway 104b. The controller 110 further identifies the overlay IP addresses of the first edge application gateway 104a and the second edge application gateway 104b assigned in the address space of the overlay network 102f from the DNS server 108. The overlay IP addresses of the first edge application gateway 104a and the second edge application gateway 104b is provided to the first edge application gateway 104a. Suppose, the address space assigned to the overlay network 102f is 192.168.6.(X). Consider the overlay IP address of the first edge application gateway 104a is 192.168.6.1 and the second edge application gateway 104b is 192.168.6.2.

Further the source IP address in the data packet is converted to the overlay IP address of the first edge application gateway 104a and the destination IP address in the data packet is converted to the overlay IP address of the second edge application gateway 104b. Therefore, the source IP address is converted to 192.168.6.1 and the destination IP address is converted to 192.168.6.2. The conversion happens based on IP table rule stored in the first edge application gateway 104a. Further, the data packet is transferred from the first edge application gateway 104a to the second edge application gateway 104b over the overlay network 102f.

On receiving the data packet; the second edge application gateway further converts the source IP address and the destination IP address. The source IP address in the data packet is converted to the overlay IP address of the second edge application gateway 104b and the destination IP address is convened to the overlay IP address of the fourth computing device 106d. The overlay IP address of the second edge application gateway 104b and the overlay IP address of the fourth computing device 106d are obtained from the DNS server 108. Suppose the overlay IP address of the second edge application gateway 104b the address space assigned to the second overlay network 102b is 191.168.2.1 Therefore the source IP address is converted to 192.168.2.1 and the destination IP address is converted to 192.168.2.2. The conversion happens based coca IP table rule stored in the second edge application gateway 104b. The data packet received at the second edge application gateway 104b is thus transferred to the fourth computing device 106d over the second overlay network 102b. Thus die data packet generated in the first computing device 106a coupled to the first overlay network 102a is transferred to the second computing device 106b coupled to the second overlay network 107b.

Figure 3:
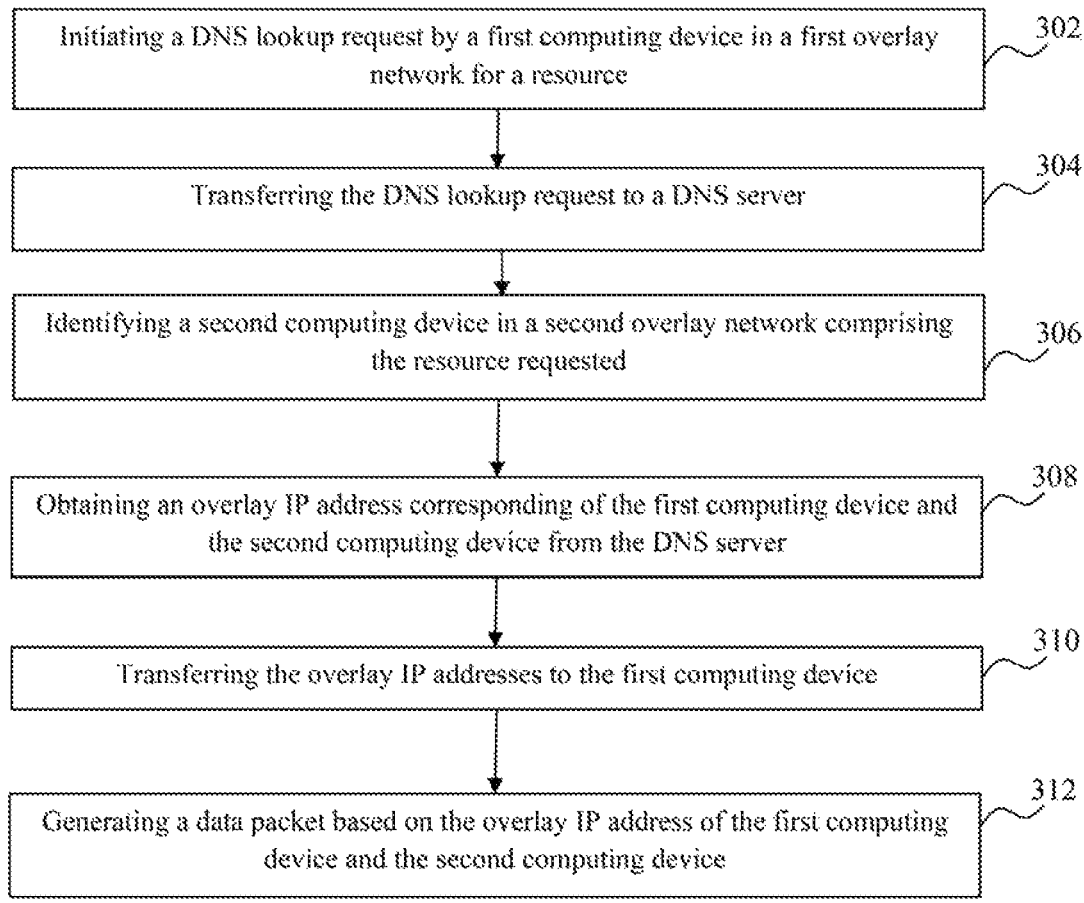
FIG. 3 illustrates a flow diagram representing a method of generating data packets, according to one embodiment herein.

FIG. 3 illustrates a flow diagram representing a method of generating data packets, according to one embodiment herein. The method includes initiating a DNS lookup request by a first computing device in a first overlay network for a resource (302). The first overlay network is one among a plurality of overlay networks coupled to a cloud network. The plurality of overlay network includes a plurality of computing devices coupled to each overlay network. An overlay IP address, is assigned to each computing device based on the address space allocated to each overlay network. The first computing device is coupled to the first overlay network.

Once the DNS lookup is initiated, the method includes transferring the Domain Name System (DNS) lookup request to a DNS server (304). The DNS server and a controller are coupled to the cloud network. The overlay IP address assigned to each computing device is stored in a DNS server. The DNS server further stores the uniform resource locator (URL) of resources in each computing device in the plurality of overlay networks. The resources are installed in the plurality of computing devices in the plurality of overlay network.

The method further includes identifying a second computing device comprising the resource requested (306). The second computing device is coupled to a second overlay network. Once the second computing device is identified, the method includes identifying the overlay IP address of the first computing device and the second computing device from the DNS server (308). The overlay IP address of the first computing device is an address assigned in the address space for the first overlay network, and the overlay IP address of the second computing device is an address assigned in the address space for the second overlay network.

The method further includes transferring the overlay IP addresses of the first computing device and the second computing device to the first computing device (310). Further, the method includes generating the data packet based on the overlay IP addresses of the first computing device and the second computing device (312).

Figure 4:
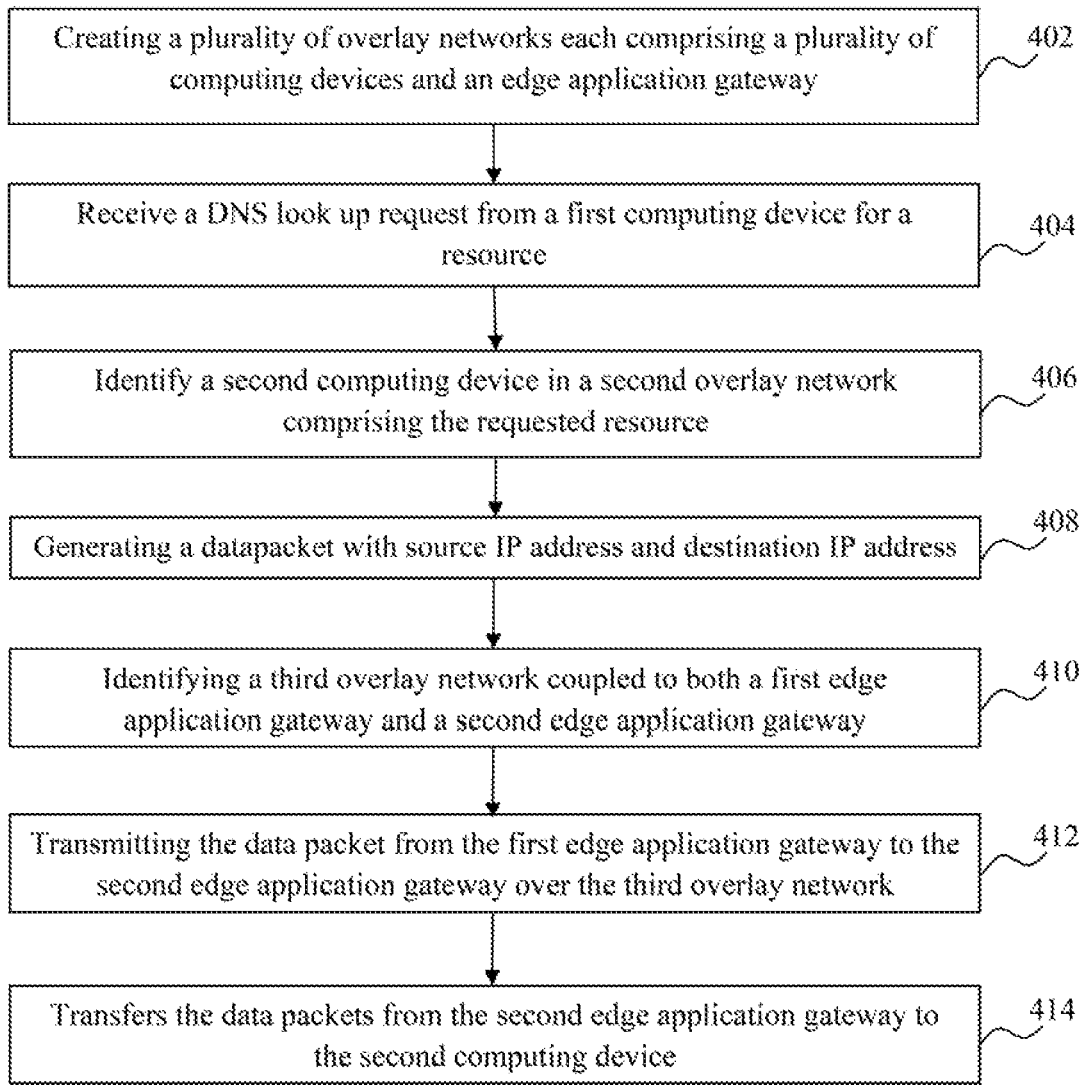
FIG. 4 illustrates a flow diagram a method of transmitting data packets from a first overlay network to a second overlay network, according to one embodiment herein.

FIG. 4 illustrates a flow diagram a method of transmitting data packets from a first overlay network to a second overlay network, according to one embodiment herein. The method includes creating a plurality of overlay networks comprising a plurality of computing devices (402). An overlay network is created by assigning an address space. Each overlay network comprises, multiple computing devices and an edge application gateway coupled to the overlay network. On creating the plurality of overlay networks.

Further, the method includes receiving a Domain Name system (DNS) lookup request for a resource from a first computing device (404). The first computing device is coupled to a first overlay network. The DNS lookup request is transferred to a DNS server. The DNS server stores the uniform resource locator (URL) of resources in each computing device in the plurality of overlay networks and overlay IP address of each computing device.

Further, the method includes identifying a second computing device comprising the resource requested (406). The resource is identified based on the information stored in the DNS server. The URL of the resource stored in the DNS server and the corresponding overlay IP of the computing device with the resource is identified. The second computing device is coupled to a second overlay network. Once the second computing device is identified the overlay IP addresses of the first computing device and the second computing device is transferred to the first computing device.

Further, the method includes generating a data packet with a source IP address and a destination IP address (408). The source IP address is the overlay IP address of the first computing device and the destination IP address is the overlay IP address of the second computing device Since the first computing device and the second computing device are coupled to different overlay networks, the data cannot be transmitted directly from first computing device to the second computing device. Therefore, the method includes pushing the transferring or pushing the data packet from the first computing device to a first edge application gateway over the first overlay network. The first edge application gateway is coupled to the first overlay network. Further, the first edge application gateway is coupled to multiple overlay networks among the plurality of overlay networks. The overlay IP addresses of the plurality of edge application gateways coupled to the plurality of the overlay networks are also stored in the DNS server. Further a second edge application gateway coupled to the second computing device in the second overlay network is also identified.

The method further identifies a third overlay network coupled to both the first edge application gateway and the second edge application gateway (410). The method further includes the obtaining the overlay IP addresses of the first edge application gateway and the second edge application gateway assigned in the address space for the third overlay network. Further, the source IP address and the destination IP address in the data packet are converted. The overlay IP address of the first computing device as source IP address is changed to the overlay IP address of the first edge application gateway and the overlay IP address of the second computing device as destination IP address is changed to the overlay IP address of the second edge application gateway.

Further, the method includes transmitting the data packet from the first edge application gateway to the second edge application gateway over the third overlay network (412). The method further includes transferring the data packets from the second edge application gateway to the second computing device (414). The source IP address in the data packet is converted to the overlay IP address of the second edge application gateway and the destination IP address as the overlay IP address of the second computing device. The overlay IP addresses of the second computing device and the second edge application gateway are addresses assigned in the address space for the second overlay network. Thus the data packets are transferred from the second edge application gateway to the second computing device.

Figure 5:
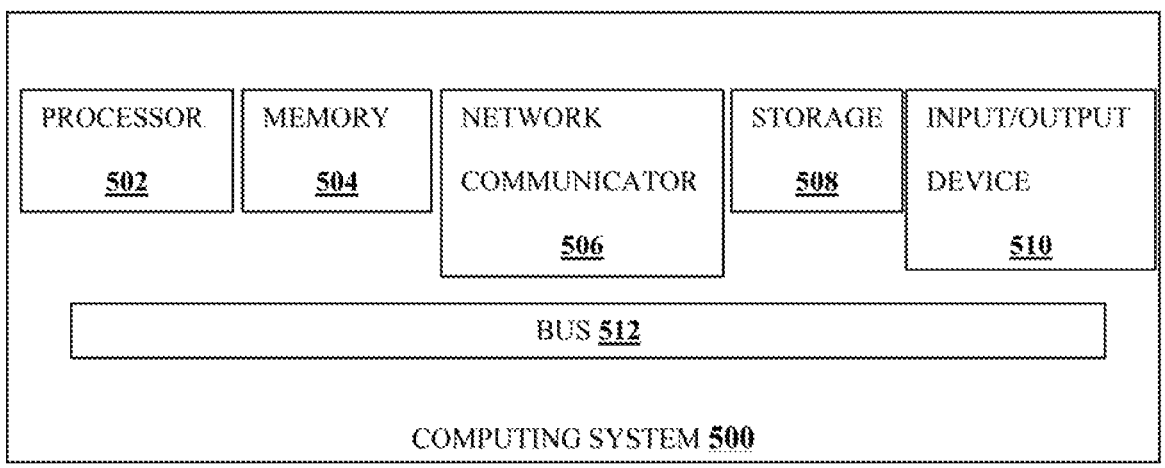
FIG. 5 is a block diagram illustrating a computing system consistent with implementations of the current subject matter, according to one embodiment herein.

FIG. 5 is a block diagram illustrating a computing system 500 consistent with implementations of the current subject matter. As shown in FIG. 5, the computing system 500 can include a processor 502, a memory 504, network communicator 506, a storage device 508, and input/output devices 510. The processor 502, the memory 504, network communicator 506, the storage device 508, and the input/output device 510 can be interconnected via a system bus 512. The processor 502 is capable of processing instructions for execution within the computing system 500. Such executed instructions can implement one or more components of, for example, application A. In some example embodiments, the processor 502 can be a single-threaded processor. Alternately, the processor 502 can be a multi-threaded processor or a multi-core processor. The processor 502 is capable of processing instructions stored in the memory 504 and/or on the storage device 508 to display graphical information for a user interface provided via the input/output device 510.

The memory 504 is a non-transitory computer readable storage medium such as a volatile or non-volatile memory that stores information within the computing system 500. The memory 504 can store instructions and/or other data associated with the processes disclosed herein. The storage device 508 is capable of providing persistent storage for the computing system 500. The storage device 508 can be a hard disk device, an optical disk device, or a tape device, or other suitable persistent storage means. The input/output device 510 provides input/output operations for the computing system 500, In some example embodiments, the input/output device 510 includes a keyboard and/or pointing device. In various implementations, the input/output device 510 includes a display unit for displaying graphical user interfaces.

According to some example embodiments, the input/output device 510 can provide input/output operations for a network device. For example, the input/output device 510 can include Ethernet ports or other networking ports to communicate with one or more wired and/or wireless, networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities e.g., generating, managing, editing of spreadsheet documents, word processing documents, and/or any other objects, etc., computing functionalities, communications functionalities, etc. Upon activation within the applications, the functionalities can be used to generate the user interface provided via the input/output device 510. The user interface can be generated and presented to a user by the computing system 500 (e.g., on a computer screen monitor, etc.).

Therefore, the embodiments herein disclose a method of routing data packets between different overlay networks. The method enables stitching a first overlay network and a second overlay network using a third overlay network. The method enables establishing communication between a first overlay network and a second overlay network through an edge application gateway.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments.

It is, to be understood that the phraseology or terminology employed herein is for the purpose of description and not of limitation. Therefore, while the embodiments herein have been described in terms of preferred embodiments, those skilled in the art will recognize that the embodiments herein can, be practiced with modifications. However, all such modifications are deemed to be within the scope of the claims.

What is claimed is:

1. A computer-implemented system for selectively interconnecting multiple overlay networks and routing data packets between said multiple overlay networks, said system comprising:
   a plurality of overlay networks, each of said plurality of overlay networks communicably coupling a plurality of computing devices, and wherein each of said plurality of computing devices is assigned an overlay IP address exclusive to a corresponding overlay network;
   a plurality of edge application gateways, each of said plurality of edge application gateways incorporated respectively within each of said plurality of overlay networks, and wherein each of said plurality of edge application gateways is communicably coupled to a cloud-based network;
   a processor and a Domain Name System (DNS) sever communicably coupled to said cloud-based network, and wherein said processor is configured to:
      in response to receiving a request from a first computing device forming a part of a first overlay network, to access a predetermined network resource, generate a DNS lookup request and transmit said DNS lookup request to a DNS server;
      trigger said DNS server to identify a second computing device incorporating said predetermined network resource requested by said first computing device, and further trigger said DNS server to identify a second overlay network incorporating said second computing device;
      generate at least one data packet to be transmitted from said first computing device to said second computing device, as a part of said first computing device requesting for access to said predetermined network resource installed within said second computing device;
      trigger said DNS server to identify an overlay IP address assigned to said first computing device from an overlay IP address space accessible only to said first overlay network, and embed said overlay IP address assigned to said first computing device, as a source IP address for said data packet;
      trigger said DNS server to identify an overlay IP address assigned to said second computing device from an overlay IP address space accessible only to said second overlay network, and embed said overlay IP address assigned to said second computing device, as a destination IP address for said data packet;
      determine if said source IP address and said destination IP address assigned to said data packet correspond to mutually different overlay networks;
      identify a first edge application gateway communicably coupled to said first computing device, and a second edge application gateway communicably coupled to said second computing device, only in an event said source IP address and said destination IP address assigned to said data packet are determined as corresponding to mutually different overlay networks;
      identify a third overlay network communicably coupled to said first edge application gateway and said second edge application gateway;
      trigger said DNS server to determine a first overlay IP address assigned to said first edge application gateway and a second overlay IP address assigned to said second edge application gateway, from an overlay IP address space accessible only to said third overlay network;
      replace said overlay IP address assigned to said first computing device, with said first overlay IP address, as said source IP address of said data packet, and replace said overlay IP address assigned to said second computing device, with said second overly IP address, as said destination IP address of said data packet;
      trigger transmission of said data packet from said first edge application gateway to said second edge application gateway;
      trigger said second edge application gateway to receive, process said data packet, and replace said first overlay IP address embedded as said source IP address, with a third overlay IP address assigned to said second edge application gateway from an overlay IP address space accessible only to said second overlay network, and further replace said second overlay IP address embedded as said destination address, with an overlay IP address assigned to said second computing device from said overlay IP address space accessible only to said second overlay network;
      trigger transmission of said data packet from said second edge application gateway to said second computing device; and
   thereby enable transmission of said data packet from said first overlay network to said overlay network, by interconnecting said first overlay network and said second overlay network through said third overlay network.

2. The system as claimed in claim 1, wherein said computing devices are selected from a group of devices consisting of computers, laptops, mobile phones, server systems, and database systems.

3. The system as claimed in claim 1, wherein each of said first overlay network, said second overlay network and said third overlay network are assigned dedicated, mutually exclusive overlay IP address spaces, and wherein said DNS server is configured to store overlay IP addresses elicited respectively from each of said overlay IP address spaces and assigned to said first overlay network, said second overlay network and said third overlay network.

4. The system as claimed in claim 1, wherein said DNS server is further configured to store a universal resource locator (URL) indicative of a location of at least said predetermined network resource requested by said first computing device.

5. The system as claimed in claim 1, wherein said DNS server is further configured to store at least said overlay IP address assigned to said first computing device from said overlay IP address space accessible only to said first overlay network, and said overlay IP address assigned to said second computing device from said overlay IP address space accessible only to said second overlay network, said first overlay IP address, said second overlay IP address, and said third overlay IP address.

6. The system as claimed in claim 1, wherein said DNS server is further configured to identify at least an overlay source IP address assigned to said first computing device from said overlay IP address space accessible only to said first overlay network, said DNS server further configured to identify at least a destination overlay IP address assigned to said second computing device from said overlay IP address space accessible only to said second overlay network.

7. A computer-implemented method for selectively interconnecting multiple overlay networks and routing data packets between said multiple overlay networks, said method comprising the following computer-implemented steps:

in response to receiving a request from a first computing device forming a part of a first overlay network, to access a predetermined network resource, generating, by said processor, a Domain Name System (DNS) lookup request and transmitting, by said processor, said DNS lookup request to a DNS server;

triggering, by said processor, said DNS server to identify a second computing device incorporating said predetermined network resource requested by said first computing device, and further triggering, by said processor, said DNS server to identify a second overlay network incorporating said second computing device;

generating, by said processor, at least one data packet transmittable from said first computing device to said second computing device, as a part of said first computing device requesting for access to said predetermined network resource installed within said second computing device;

triggering, by said processor, said DNS server to identify an overlay IP address assigned to said first computing device from an overlay IP address space accessible only to said first overlay network, and to embed said overlay IP address assigned to said first computing device, as a source IP address for said data packet;

triggering, by said processor, said DNS server to identify an overlay IP address assigned to said second computing device from an overlay IP address space accessible only to said second overlay network, and to embed said overlay IP address assigned to said second computing device, as a destination IP address for said data packet;

determining, by said processor, if said source IP address and said destination IP address assigned to said data packet correspond to mutually different overlay networks;

identifying, by said processor, a first edge application gateway communicably coupled to said first computing device, and a second edge application gateway communicably coupled to said second computing device, only in an event said source IP address and said destination IP address assigned to said data packet are determined as corresponding to mutually different overlay networks;

identifying, by said processor, a third overlay network communicably coupled to said first edge application gateway and said second edge application gateway;

triggering, by said processor, said DNS server to determine a first overlay IP address assigned to said first edge application gateway and a second overlay IP address assigned to said second edge application gateway, from an overlay IP address space accessible only to said third overlay network;

replacing, by said processor, said overlay IP address assigned to said first computing device, with said first overlay IP address, as said source IP address of said data packet, and replacing, by said processor, said overlay IP address assigned to said second computing device, with said second overly IP address, as said destination IP address of said data packet;

triggering, by said processor, transmission of said data packet from said first edge application gateway to said second edge application gateway;

triggering, by said processor, said second edge application gateway to receive, process said data packet, and replace said first overlay IP address embedded as said source IP address, with a third overlay IP address assigned to said second edge application gateway from an overlay IP address space accessible only to said second overlay network, and further replace said second overlay IP address embedded as said destination address, with an overlay IP address assigned to said second computing device from said overlay IP address space accessible only to said second overlay network; and triggering, by said processor, transmission of said data packet from said second edge application gateway to said second computing device, and thereby enabling transmission of said data packet from said first overlay network to said overlay network, by interconnecting said first overlay network and said second overlay network through said third overlay network.

8. The method as claimed in claim 7, wherein the method further includes the following steps:

assigning, by said processor, dedicated, mutually exclusive overlay IP address spaces to each of said first overlay network, said second overlay network and said third overlay network; and configuring, by said processor, said DNS server to store overlay IP addresses elicited respectively from each of said overlay IP address spaces and assigned to said first overlay network, said second overlay network and said third overlay network.

9. The method as claimed in claim 7, wherein the method further includes the step of configuring, by said processor, said DNS server to store a universal resource locator (URL)

indicative of a location of at least said predetermined network resource requested by said first computing device.

10. The method as claimed in claim 7, wherein the step of triggering said DNS server to identify an overlay IP address assigned to said first computing device from an overlay IP address space accessible only to said first overlay network, further includes the step of triggering, by said processor, said DNS server to identify at least an overlay source IP address assigned to said first computing device from said overlay IP address space accessible only to said first overlay network.

11. The method as claimed in claim 7, wherein the step of triggering, by said processor, said DNS server to identify an overlay IP address assigned to said second computing device from an overlay IP address space accessible only to said second overlay network, further includes the step of triggering, by said processor, said DNS server to identify at least a destination overlay IP address assigned to said second computing device from said overlay IP address space accessible only to said second overlay network.

12. A non-transitory computer-readable storage medium having computer-executable instructions stored thereon, said computer-executable instructions, when executed by a processor, cause said processor to:
  generate a Domain Name System (DNS) lookup request in response to receiving a request from a first computing device forming a part of a first overlay network, to access a predetermined network resource;
  transmit said DNS lookup request to a DNS server;
  trigger said DNS server to identify a second computing device incorporating said predetermined network resource requested by said first computing device, and further trigger said DNS server to identify a second overlay network incorporating said second computing device;
  generate at least one data packet transmittable from said first computing device to said second computing device, as a part of said first computing device requesting for access to said predetermined network resource installed within said second computing device;
  trigger said DNS server to identify an overlay IP address assigned to said first computing device from an overlay IP address space accessible only to said first overlay network, and to embed said overlay IP address assigned to said first computing device, as a source IP address for said data packet;
  trigger said DNS server to identify an overlay IP address assigned to said second computing device from an overlay IP address space accessible only to said second overlay network, and to embed said overlay IP address assigned to said second computing device, as a destination IP address for said data packet;
  determine if said source IP address and said destination IP address assigned to said data packet correspond to mutually different overlay networks;
  identify a first edge application gateway communicably coupled to said first computing device, and a second edge application gateway communicably coupled to said second computing device, only in an event said source IP address and said destination IP address assigned to said data packet are determined as corresponding to mutually different overlay networks;
  identify a third overlay network communicably coupled to said first edge application gateway and said second edge application gateway;
  trigger said DNS server to determine a first overlay IP address assigned to said first edge application gateway and a second overlay IP address assigned to said second edge application gateway, from an overlay IP address space accessible only to said third overlay network;
  replace said overlay IP address assigned to said first computing device, with said first overlay IP address, as said source IP address of said data packet, and replace said overlay IP address assigned to said second computing device, with said second overly IP address, as said destination IP address of said data packet;
  trigger transmission of said data packet from said first edge application gateway to said second edge application gateway;
  trigger said second edge application gateway to receive, process said data packet, and replace said first overlay IP address embedded as said source IP address, with a third overlay IP address assigned to said second edge application gateway from an overlay IP address space accessible only to said second overlay network, and further replace said second overlay IP address embedded as said destination address, with an overlay IP address assigned to said second computing device from said overlay IP address space accessible only to said second overlay network; and
  trigger transmission of said data packet from said second edge application gateway to said second computing device, and thereby enable transmission of said data packet from said first overlay network, to said overlay network, by interconnecting said first overlay network and said second overlay network through said third overlay network.

13. The computer-executable instructions as claimed in claim 12, wherein said instructions, when executed by said processor, further cause said processor to:
  assign dedicated, mutually exclusive overlay IP address spaces to each of said first overlay network, said second overlay network and said third overlay network;
  configure said DNS server to store overlay IP addresses elicited respectively from each of said overlay IP address spaces and assigned to said first overlay network, said second overlay network and said third overlay network;
  configure said DNS server to store a universal resource locator (URL) indicative of a location of at least said predetermined network resource requested by said first computing device;
  trigger said DNS server to identify at least an overlay source IP address assigned to said first computing device from said overlay IP address space accessible only to said first overlay network; and
  trigger said DNS server to identify at least a destination overlay IP address assigned to said second computing device from said overlay IP address space accessible only to said second overlay network.

* * * * *